United States Patent [19]

O'Toole

[11] Patent Number: 4,838,361
[45] Date of Patent: Jun. 13, 1989

[54] ATTACHMENT FOR POWER TOOL

[76] Inventor: Marc L. O'Toole, 7614 Fourth St., Scottsdale, Ariz. 85251

[21] Appl. No.: 539,642

[22] Filed: Oct. 6, 1983

[51] Int. Cl.$^4$ .............................................. B23Q 5/00
[52] U.S. Cl. .................................. 173/12; 73/862.32; 192/107 M; 464/51
[58] Field of Search ................... 173/12, 163; 192/66, 192/107 C, 107 M; 73/862.13, 862.19, 862.21, 862.31, 862.32, 862.33; 464/78, 51

[56] References Cited

U.S. PATENT DOCUMENTS

| | | | |
|---|---|---|---|
| 3,129,300 | 4/1964 | Moyles | 73/862.32 X |
| 3,166,935 | 1/1965 | Sundt | 73/862.32 |
| 3,453,874 | 7/1969 | Cline | 73/862.13 |
| 3,537,275 | 11/1970 | Smith | 192/107 M |
| 3,946,603 | 3/1976 | Houvouras | 73/862.19 |
| 4,055,080 | 10/1977 | Farr et al. | 73/862.31 X |
| 4,250,983 | 2/1981 | Handke | 192/107 M |

FOREIGN PATENT DOCUMENTS 163867 10/1982 Japan .................................. 73/862.19

Primary Examiner—Frank T. Yost
Assistant Examiner—Willmon Fridie, Jr.
Attorney, Agent, or Firm—Richard R. Mybeck

[57] ABSTRACT

An attachment for power driven torque tools for measuring and limiting the torque developed thereby, which comprises a drive shaft and a driven shaft, each supporting a transverse plate at the inner end thereof, and a flexible mass operatively interposed between said plates for transmitting force from said drive shaft to said driven shaft, while said tool fastener is freely operational and for developing a measurable flexion therewith in when said driven shaft encounters resistance from the fastener associated therewith. The flexion is detected by a variable resistor which transmits a value to a control circuit for comparison against a preset value and activation of a power shut off when said transmitted value attains a preset relationship to said preset value.

10 Claims, 1 Drawing Sheet

ATTACHMENT FOR POWER TOOL

BACKGROUND OF INVENTION

The present invention relates generally to the field of torque tools and more particularly to a unique attachment for use with such tools for measuring and limiting the torque developed thereby in a manner which permits a greater degree of control with fewer wear parts than has been heretofore been attainable.

A wide variety of torque tools have been developed and are commercially available. For example electrically powered and air-powered torque wrenches are in common use. Some tools often include means for limiting the amount of torque developed by the tool so that the object being driven thereby will be torqued to a degree short of the force which would shear the member upon which the driven object is applied. Such mechanisms include governor controls and stall arrangements. Still others such as impact wrenches include means for alternately supplying and releasing the torque in order to reduce the reaction torque sensed by the operator of the tool.

The prior art reveals various types of control systems for controlling the amount of torque applied to a fastener. One common type employs a torque control in which the wrench tightens the fastener to a maximum predetermined value of torque and thereupon shuts off. Examples of various forms of such torque control are found in U.S. Pat. Nos. 4,316,512; 4,281,538; 4,199,032; 4,060,137; 4,006,784; 3,969,810; 3,835,934; 3,833,068; 3,703,933; 3,174,559; 3,018,866 and 2,543,979.

Another system of controlling wrenches found in the prior art is generally known as a "turn-of-the-nut" system in which a fastener is tightened to a preselected initial condition and thereafter rotated an additional predetermined number of degrees before sutting off. Examples of these systems are found in U.S. Pat. Nos. 3,623,557; 3,318,390 and 3,011,479.

Still another type of control involves imparting a constant angular momentum to each impluse blow as is shown in U.S. Pat. No. 3,181,672.

Each of the foregoing suffered disadvantages such as relatively slow operation and relatively inaccurate measurement of the applied torque. Still other systems place the control mechanism in position to receive the shock created by the impulse action of the tool. These mechanisms were readily damaged and maintenance and replacement costs were high.

SUMMARY OF INVENTION

The present invention is predicated upon my design of new and unique means and methods for monitoring and controlling the torque delivered by a power driven tool which when attached thereto causes the torque developed thereby to be trasmitted through a flexible linkage which, in coaction with unique monitor and control, causes a change in the value of variable resistor incorporated therewith which in turn alters a precalibrated electronic circuit to open and close a solenoid or relay operatively disposed in line with the power source of the tool and hence activates and deactivates the driving force applied thereto in response to the rotational flexion occurring on opposite faces of the flexible linkage. In such a way, many of the problems and limitations heretofore present in the aforedescribed prior art are eliminated or significantly reduced.

Accordingly, it is a prime object of the present invention to provide means and methods for monitoring and regulating the torque applied to a given fastener assembly by a torque wrench or the like, which means and methods overcome the deficiencies of the prior art and enable the torque to be readily monitored and controlled in an accurate, reliable and non-destructive manner.

Still another object of the present invention is to provide a control attachment for torque tools which is easy to operate, inexpensive to manufacture, and avoids significant maintenance and replacement costs.

A further object of the present invention is to provide a novel and unique assembly for translating the torque of the tool into and through a flexible mass operatively associated therewith, detecting the rotational flexion of the mass with a variable resistor and electronically comparing the detected flexion with a preselected fixed resistance and disconnecting the power source for such tool when the detected flexion attains a predetermined reltionship to said preselected value.

These and still further objects as shall hereinafter appear are readily fulfilled by the present invention in a manner which can be readily discerned from the following detailed description of certain exemplary embodiments thereof, especially when read in conjuction with the accompanying drawing in which like parts bear like indicia throughout the several views.

THE DRAWINGS

DESCRIPTION OF PREFERRED EMBODIMENT,

Before describing in detail the attachment and control system of the present invention, some general discussion of the operation of impact wrenches and like torque tools is deemed appropriate. All impact wrenches operate by the periodic release and build up of kinetic energy in the form of a series of torsional shock impluses which are directed to a fastener assembly such as a nut and bolt. As a result of this action, considerable impact force can be produced with little reactive torque. Pneumatically driven impact wrenches, that is, those driven by compressed air, as contrasted with those driven by electrical or hydraulic power, comprise a vane type air motor and a hammer/anvil mechanism. When the air motor gains sufficient speed, a high inertia hammer on the motor shaft engages an anvil on the wrench drive shaft. The energy of the blow is dissipated as a result of the collision; stored as torsional strain energy in the mechanism, the drive shaft, and the fastener coupling; and thereafter transferred to the fastener where it is converted to the work of tightening the fastener. The hammer then disengages from the anvil and the motor accelerates for a complete revolution before delivering the next blow. The wrench can be designed to deliver one or more blows for each revolution of the motor. It is in this setting that the present invention will be described even though it is apparent that the attachment is equally suited for any power driven torque imparting tool.

Specifically, the present invention embraces novel means and methods which when attached to a power tool render it capable of consistently applying a precise torque to a threaded fastener so the a uniform degree of tigthening of any number of fasteners can be obtained. To this end, the tool, when equipped with the attachment hereof, is provided with a novel torque responsive control which serves to rapidly and precisely monitor the torque developed thereby and thereafter terminate the power source, and hence the operability of the tool, when a preselected torque has been applied to the fastener.

Figure 1:
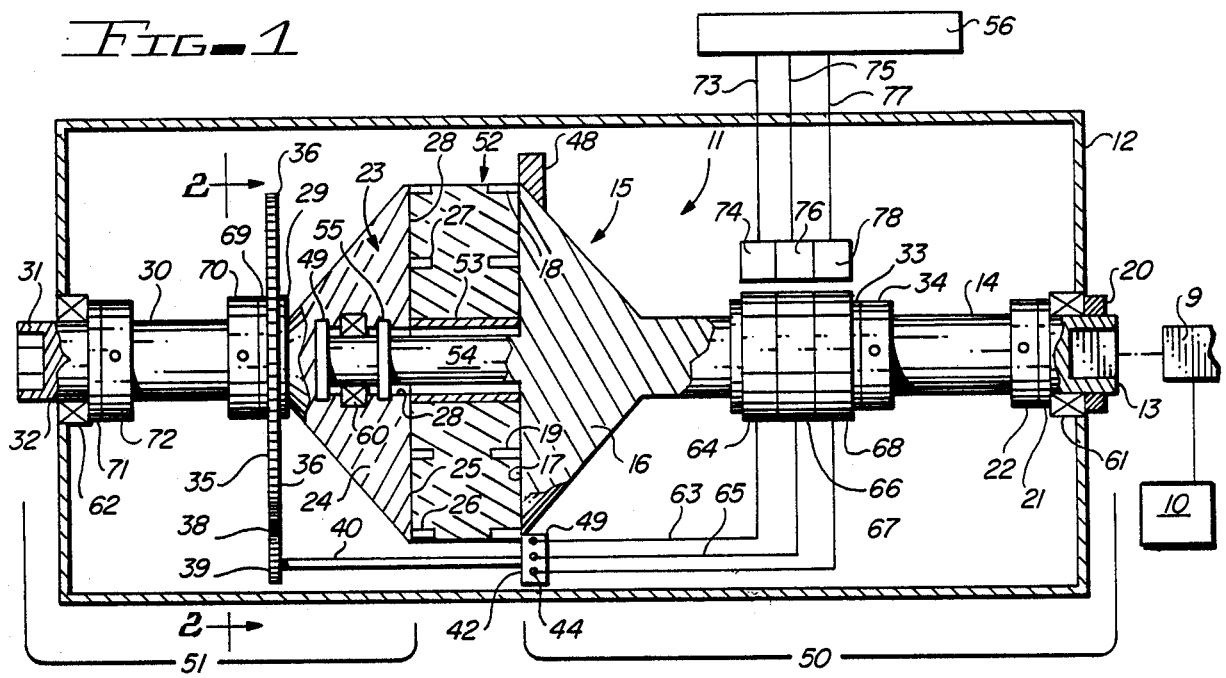
FIG. 1 is a side elevation, partially schematic and partially in section, of a power tool attachment embodying the present invention.

Referring to FIG. 1, one embodiment of the present invention is shown in coaction with a power tool 9 driven by a power source 10. My attachment is represented by the general numeral 11 and is enclosed within a housing 12.

Each attachment 11 comprises a tool coupler 13 mounted coaxially with shaft 14 which in turn is integrally formed with a first grabber plate 15 for rotation therewith. In some applications, coupler 13 will be formed integrally with shaft 14 and will be secured by a set collar 20 disposed in circumscription thereabout adjacent housing 12.

Grabber plate 15 comprises a generally conical body portion 16 having circular face 17 upon which first and second cylindrical retaining pins 18, 19 are formed for a purpose to be hereinafter described. Again, when lower torque values are employed, one of the retaining pins can be omitted without impairing the function of the attachment.

A second grabber plate 23, constructed similarly to grabber plate 15, is disposed in spaced opposing relationship to plate 15 and comprises a conical body portion 24 and a circular face 25 having an outer retaining member 26 and an inner retaining member 27 disposed in spaced relationship to the center point therefore in either registered or offset relationship to pin members 18, 19 of face 17, respectively. A central bore 28 is disposed through face 25 into body portion 24 in generally axial alignment with shaft 14 for a purpose to be hereinafter described.

Grabber plate 23 is integrally formed with driven shaft 30 which extends axially therefrom to a fastener securing socket 31 disposed on the distal end 32 of shaft 30. Socket 31 may be formed using either the male or female linking concepts presently well known to provide a socket driver source to serve the particular fastener to be engaged thereby.

Figure 3:
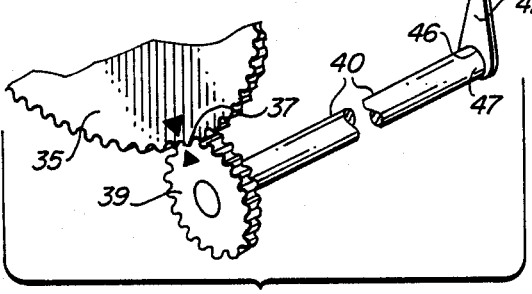
FIG. 3 is a broken view showing means for activating the potentiometer of the present invention.
Figure 4:
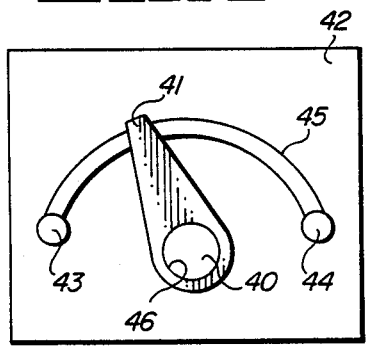
FIG. 4 is an enlarged showing of a portion of the monitoring mechanism embodying a feature of the present invention.

A driving gear 35, having a plurality of teeth 36 equispaced about the perimeter thereof, is mounted in concentric relationship with shaft 30 for operative engagement on a tangent 37 thereof with the equally spaced peripheral teeth 38 of a driven gear 39. At the center of driven gear 39 is secured a potientometer shaft 40 which extends normal from the vertical plane of gear 39 for secure engagement with the center tap 41 of a variable resistor 42 secured on the perimeter of grabber plate 15 in such a position that when center tap 41 is in its mid-position between poles 43, 44, which are disposed at opposite ends of a resistance element 45, the socket 46 of the center tap 41 receives and secures the projecting end 47 of potientometer shaft 40 for movement in response thereto as is shown in FIGS. 3 and 4.

Referring back to FIG. 1, attachment 11 can be considered to comprise a driving subassembly 50 and a driven subassembly 51. Driving subassembly 50 extends from coupler 13 through shaft 14 to first grabber plate 15. Driven subassembly 51 extends from second grabber plate 23 through driven shaft 30 to socket 31. A suitable bearing assembly 60 is operatively disposed in grabber plate 23 to support stabilizer bar 54 for rotation therewithin. Bar 54 is integrally formed with and extends axially from face 17 of grabber plate 15 through bore 28 into bearing assembly 60. Suitable bearing assemblies 61, 62 are respectively mounted adjacent each end of housing 12 to respectively support the shafts 14, 30 for rotation therewithin. When the exigencies of a given installation permit the use of over sized bearing assemblies 61, 62 to support the respective shafts 14, 30, the need for stabilizer bar 54 to maintain the axial alignment of shafts 14, 30 is reduced and bar 54 may be eliminated thereby simplifying the fabrication of driving subassembly 50.

A suitable washer 21 and lock ring 22 are secured in abutting relationship to each other and bearing assembly 61 about shaft 14 to secure the bearing assembly 61 in place.

A similiar washer 29 abuts body portion 16 of grabber plate 15 and, in turn is engaged by a plurality of slip rings 64, 66, 68 which in turn is engaged by washer 33 and lock ring 34 to secure the several parts in their desired location. While in FIG. 1, slip rings 64, 66, 68 are shown spaced from washer 29, this has been done to facilitate the description of the device, not reflect the actual relationship between the several parts.

In the driven assembly 51, washer 29 abuts body portion 24 and driving gear 35 is snugly laid thereagainst with another like washer 69 abuting gear 35 on the other side thereof which in turn is secured by lock ring 70. Adjacent bearing assembly 62, washer 70 and lock ring 72 are used to secure bearing assembly 62 in place in the manner already described with respect to bearing assembly 61.

Intermediate driving subassembly 50 and driven subassembly 51 and more particularly between face 17 of first grabber plate 15 and face 25 of second grabber plate 23 is disposed a flexible mass 52 to define a flexible linkage therebetween in a manner to be now described.

As previously shown, grabber plate 15 is provided with a plurality of spaced retainer members 18, 19 which extend outwardly from face 17 in a generally normal relationship thereto. Grabber plate 23 is likewise provided with a plurality of similarly spaced members 26, 27 projected generally normal from face 25 in a position which is either in registry or staggered relative to members 18, 19 in face 17.

Flexible mass 52, preferably formed of Chromalloy, an elastomeric plastic or a like memory-capable material, is dimensioned to fit snugly between plates 15 and 23 and is engaged and secured therebetween by the coaction of members 18, 19 with members 26, 27 in force transmitting relationship therewith. When the attachment is fabricated to include stabilizer bar 54, a hollow opening 53 is defined through the center of flexible mass 52 generally coaxially with shafts 14 and 30 to receive and hold stablizer bar 54 on the rotational axis thereof. Annular washers 49, 55 are operatively disposed in abutting relationship on opposite faces of bearing assembly 60 in circumscription about and secured to bar 54 to limit the rectilinear movement of bar 54 relative to flexible mass 52. When a particular application of my appliance does not require stabilizer bar 54 to maintain shafts 14, 30 in axial alignment, bores 28 and 53, washers 49, 55 and bearing assembly 60 may be omitted. In a preferred embodiment of my invention, complimentary openings are defined in flexible mass 52 in registry with members 18,19,26, and 27 to receive and retain said members in a more secure fashion.

As previously described, a variable resistor 42 is secured on the periphery of plate 15 in a postion corresponding to the position of gear 39 relative to plate 23. Thus when tool 19 is at rest, potentiometer shaft 40 positions the center tap 41 of the resistor 42 at its approximate mid point, that is, half way between poles 43 and 44 (See FIG. 4) whereby sensitivity is imparted to the resistor irrespective of the direction of rotation adopted by the tool thereby enabling the tool and the monitoring device to be equally effective for both left hand and right hand threaded fasteners. See FIGS. 3 and 4.

Referring back to FIG. 1, a suitable counter weight 48 is secured to the perimeter of a plate 15 at a position diametetrically opposite of resistor 42 to offset any eccentricity caused by the mass of the resistor 42 during rotation of the attachment.

Figure 2:
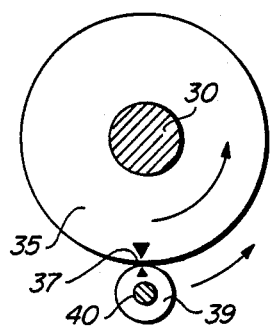
FIG. 2 is a cross section taken along line 2—2 of FIG. 1 with various positions thereof shown as 2A, 2B and 2C.
Figure 2A:
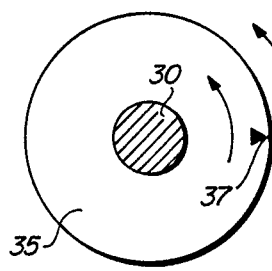
Figure 2B:
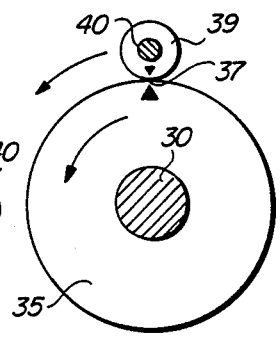
Figure 2C:
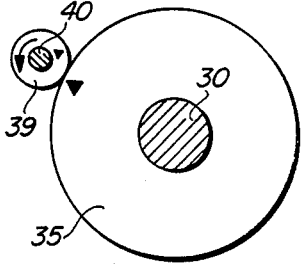

As shown in FIGS. 1 and 2, the rotation imparted to shaft 14 by the power tool 10 coupled thereto through coupler 13 causes drive gear 35 and driven gear 39 to rotate as one (See FIGS. 2A, 2B) until that moment when shaft 30 is slowed by the mechanical resistance of the newly tightened fastener while shaft 14 continues to receive full force from tool 9. At that instant, because teeth 36 mesh with teeth 38 at the tangent 37 thereof, driven gear 39 will rotate in response to the flexion imparted to flexible mass 52 which reflects the disparate rotation of the shafts 14, 30 connected thereto.

Grabber plate 15 and grabber plate 25 will rotate together uniformly as long as the torque introduced into flexible mass 52 through shaft 14 equals the torque transmitted therefrom through shaft 30 to the fastener being tightened. However, when the fastener reaches point of resistance so that the rotation thereof is impeded, grabber plate 23 will rotate a degree more than plate 15 creating flexion in flexible mass 52 whereupon potentiometer shaft 40 is caused to rotate which turns center tap 41 of the variable resistor or potentiometer 42 causing its contact with resistance element 45 to migrate toward one or the other of poles 43,44 and alter the resistance produced between the center tap 41 and the effected pole(s). The potentiomenter shaft 40, being rigidly connected both to center socket 46 and gear 39, turns center socket 46 in response to the rotation of gear 39 which causes the center tap to ride the resistor element 45 and create a calibratable measure of the torque differential created in flexible mass 52.

The electrical circuitry of the variable resistor 42 is created by connecting one wire 63 between left pole 43 and left slip ring 64, connecting a second wire 65 between center tap 41 and center slip ring 66, and connecting a third wire 67 between right slip ring 68. The corresponding brush 74, 76, 78 for each slip ring, 64, 66, 68, respectively, is in turn connected to a separate but corresponding contact in control box 56 by wires 73, 75 and 77, respectively. It should be noted that while wires 63, 65 and 67 are shown schematically to be external of the rotating parts, this position is used only to facilitate the reader's understanding of the disclosure. In actual construction, wires 63, 65 and 67 will pass through body portion 16 and along shaft 14 for connection with slip rings 64, 66, 68 and will not be exposed outside of the attachment.

Figure 5:
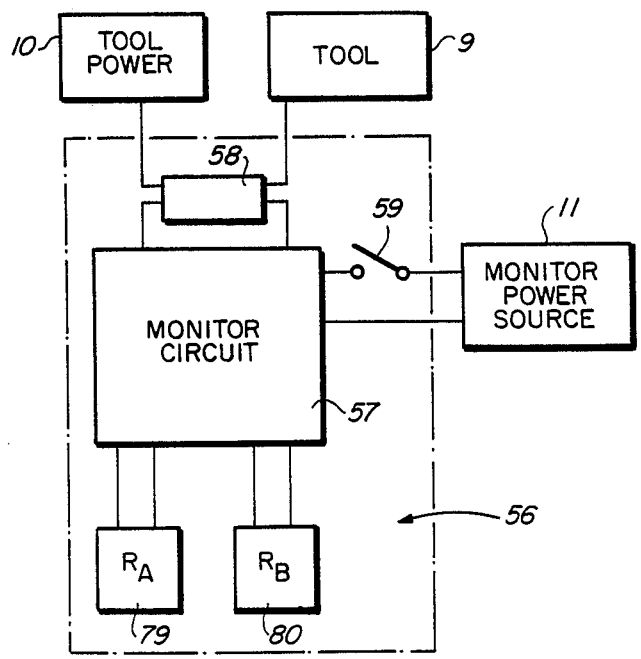
FIG. 5 is a schematic diagram showing of the electrical circuitry of the device of FIG. 2.

Within control box 56, shown schematically at FIG. 5, control circuit 57 comprises means for comparing the resistance developed by the variable resistor 42 of the attachment, which is delivered to control box 56 as indicated above, with a preselected fixed resistance, established at control box 56, which resistance will reflect the maximum torque desired of the tool. When the value of the transmitted resistance reaches a predetermined relationship with the calibrated resistance, control circuit 57 activates a solenoid or relay 58 which in turn disconnects power source 10 from the tool 9. The independent monitor power source, shown schematically in FIG. 5, is selectively activated by a conventional switch 59.

In operation, attachment 12 is mounted to a suitable power tool 9 for coaction therewith. The fastener to be tightened or loosened by the operator is engaged in a complementary socket 31 and the tool is turned on by initiating power source 10. The tool's rotationl force is transmitted through shaft 14, flexible mass 52, shaft 30, and socket 31 to twist the fastener.

When the fastener is tight, shaft 14, which is directly connected to tool 9, continues to rotate while shaft 30, directly connected to the fastener, slows creating a rotational differential between grabber plates 15 and 23 and hence the opposite faces of flexible mass 52. This differential, herein called "flexion", is reflected as described by the movement of potentiometer shaft 40 within center tap socket 46 which causes the center tap contact 41 to migrate toward the lead pole, for instance, pole 43, on the resistance element 45 thereby creating a signal which, because of prior calibration, is directly reflective of the rotational differential between plates 15 and 23. This signal is instantly fed into monitor circuit 57 where it is electronically compared against the preset fixed resistance, which was pre-calibrated in control box 56 to reflect the maximum torque desired. When such comparison indicates that the preselected maximum torque has been reached, the control circuit 57 activates solenoid 58 which in turn disconnects the power source to the tool and shuts off the tool. All of the foregoing occurs substantially instantaneously.

The monitoring system herein described and illustrated can be adapted with equally efficacious results to a variety of mechanical environments where the measure and control of the rotational differential of two contiguous members is desired.

From the foregoing it is apparent that all of the aforestated objectives have been fulfilled by the present invention in a remarkably unexpected fashion. It is of course understood that such modifications, alterations and adaptations as may readily occur to the skilled artisan when confronted with this disclosure are intended within the spirit of this invention which is limited only by the scope of the claims appended hereto.

Accordingly what I claim is:

1. An attachment for monitoring and regulating the torque output of a power driven tool comprising:
 (a) a driving subassembly for detachably securing said attachment to a power tool and receiving rotational force therefrom;
 (b) a driven subassembly for detachably engaging a fastener with said attachment and transmitting rotational force thereto; and (c) intermediate means operatively interposed between said driving subassembly and said driven subassembly for transmitting rotational forces therebetween, said intermediate means comprising
  (i) a first and second plate each having a planar facing surface disposed in spaced opposing relationship to each other, said first plate being integrally joined with said driving subassembly and said second plate being integrally joined with said driven subassembly.
  (ii) a flexible mass operatively interposed, between and secured by said first and second plate in surface-to-surface engagement therewith and adapted to transmit rotational forces from said first plate to said second plate and flex when said second palte resists said transmission of rotational force,
  (iii) monitoring means for measuring the flex in said flexible mass resulting from a different rotational characteristc of said second plate relative to said first plate and transmitting an electrical signal reflective thereof, and
  (iv) means for receiving said electrical signal, comparing it to a preselected standard, and reacting to said comparison to maintain or disconnect the power source to said power driven tool.

2. An attachment according to claim 1 in which said first plate and said second plate have retaining members disposed thereupon and extending outwardly therefrom for engaging and holding said flexible mass therebetween.

3. An attachment according to claim 2 in which said retaining members are disposed in offset relationship to each other.

4. An attachment according to claim 1 in which said driving subassembly comprises a tool engaging coupler, and a shaft extending axially away from said coupler toward said driven subassembly.

5. An attachment according to claim 4 in which said shaft includes an axially extending portion passing through said flexible mass into free-turning non-driving relationship within said driven subassembly in non-driving relationship thereto.

6. An attachment for monitoring and regulating the torque output of a power driven tool comprising:
  (a) a driving subassembly for detachably securing said attachment to a power tool and receiving rotational force thereform;
  (b) a driven subassembly for detachably engaging a fastener with said attachment and transmitting rotational force thereto; and
  (c) intermediate means operatively interposed between said driving subassembly and said driven subassembly for transmitting rotational forces therebetween, said intermediate means comprising
  (i) a first plate and a second plate disposed in spaced opposing relationship to each other, said first plate being integrally joined with said driving subassembly and said second plate being intergrally joined with said driven subassembly,
  (ii) an elastomeric member operatively interposed between and secured by said first and second plate and adapted to transmit rotational forces from said first plate to said second plate when said fastener responds to said driven subassembly and flex when said fastener resists the transmission of rotational force by said driven subassembly,
  (iii) monitoring means for measuring the flex in said elastomeric member having a gear synchronized to the movement of said second plate; a variable resistor having a resistable element and a movable center tap secured to the perimeter of said first plate in registry with the center axis of said gear; and a shaft member secured to and extending from said center axis of said gear into secure engagement in said center tap and operable to move said center tap to reflect the rotational displacement of said second plate relative to said first plate to create a transmittable electrical signal proportional to said movement, and
  (iv) means for receiving said electrical signal to compare it to a present standard and react to said comparision to maintain or disconnect the power source to said power driven tool.

7. An attachment according to claim 6 in which a plurality of slip rings are mounted in circumscription about said drive shaft and electrically connected to said variable resistor through said first plate.

8. An attachment according to claim 6 in which a first gear wheel is integrally mounted to said driving shaft in circumscription therewith, a second gear wheel is disposed on the tangent of said first gear wheel in engaging relationship thereto; and said shaft member is secured to said gear at the center point thereof and extends therefrom into secured engagement in said center tap.

9. An attachment according to claim 8 in which said resistance element is arcuately disposed between a first and second end contact.

10. An attachament according to claim 9 in which said center tap comprises a socket portion for receiving and securing said shaft thereto and an elongated contact extending radially from said socket for engagement with said arcuate resistance element.

* * * * *